United States Patent
Tredak et al.

(10) Patent No.: US 9,804,826 B2
(45) Date of Patent: Oct. 31, 2017

(54) PARALLELIZATION OF RANDOM NUMBER GENERATORS

(71) Applicant: NVIDIA Corporation, Santa Clara, CA (US)

(72) Inventors: Przemyslaw Tredak, Warsaw (PL); John Clifton Woolley, Jr., Palmyra, VA (US)

(73) Assignee: Nvidia Corporation, Santa Clara, CA (US)

( * ) Notice: Subject to any disclaimer, the term of this patent is extended or adjusted under 35 U.S.C. 154(b) by 100 days.

(21) Appl. No.: 14/562,504

(22) Filed: Dec. 5, 2014

(65) Prior Publication Data

US 2016/0162262 A1    Jun. 9, 2016

(51) Int. Cl.
*G06F 7/58* (2006.01)

(52) U.S. Cl.
CPC ..................... *G06F 7/586* (2013.01)

(58) Field of Classification Search
None
See application file for complete search history.

(56) References Cited

U.S. PATENT DOCUMENTS

| | | | |
|---|---|---|---|
| 5,258,936 A | 11/1993 | Gallup et al. | |
| 5,335,275 A | 8/1994 | Millar et al. | |
| 6,025,888 A | 2/2000 | Pauls | |
| 6,104,810 A | 8/2000 | Debellis et al. | |
| 6,502,116 B1 | 12/2002 | Kelly et al. | |
| 6,535,988 B1 | 3/2003 | Poisner | |
| 6,829,628 B2 | 12/2004 | Kim | |
| 7,861,060 B1* | 12/2010 | Nickolls | G06F 9/522 712/22 |
| 8,355,449 B2 | 1/2013 | Moccagatta | |
| 8,437,405 B1 | 5/2013 | Moccagatta | |
| 8,438,370 B1* | 5/2013 | Budge | G06F 9/3879 712/241 |
| 2002/0016935 A1* | 2/2002 | Bergsten | G06F 17/30356 714/20 |
| 2002/0159525 A1 | 10/2002 | Jeong | |
| 2003/0158608 A1 | 8/2003 | Ishikawa et al. | |

(Continued)

OTHER PUBLICATIONS

Saito et al., Variants of Mersenne Twister Suitable for Graphic Processors, May 27, 2010, Cornell University Library, http://arxiv.org/abs/1005.4973.

*Primary Examiner* — David H Malzahn (57) ABSTRACT

System and method for pseudo-random number generation based on a recursion with significantly increased multi-threaded parallelism. A single pseudo-random generator program is assigned with multiple threads to process in parallel. N state elements indexed incrementally are arranged into a matrix comprising x rows, where a respective adjacent pair of state elements in a same column are related by g=(M+j)mod N, wherein j and g represent indexes of the pair of state elements. x can be determined through an modular manipulative inverse of M and N. The matrix can be divided into sections with each section having a number of columns, and each thread is assigned with a section. In this manner, the majority of the requisite interactions among the state elements occur without expensive inter-thread communications, and further each thread may only need to communicate with a single other thread for a small number of times.

20 Claims, 7 Drawing Sheets

(56) References Cited

U.S. PATENT DOCUMENTS

| | | |
|---|---|---|
| 2003/0235249 A1 | 12/2003 | Zhao et al. |
| 2004/0114576 A1 | 6/2004 | Itoh et al. |
| 2004/0184548 A1 | 9/2004 | Kerbiriou et al. |
| 2008/0201721 A1* | 8/2008 | Little .................... G06F 9/5027 718/106 |
| 2016/0162262 A1* | 6/2016 | Tredak .................... G06F 7/586 708/256 |

* cited by examiner

PARALLELIZATION OF RANDOM NUMBER GENERATORS

TECHNICAL FIELD

The present disclosure relates generally to the field of parallel data processing, and, more specifically, to the field of random number generation.

BACKGROUND

The Mersenne Twister is a well known procedure applicable for pseudo random number sequence generation. It is capable of generating high-quality random numbers with long period at a high speed. Among the several variants of the Mersenne Twisters, the MT19937 generator is recognized to be superbly reliable and thus widely used for various scientific and commercial purposes. The MT19937 generator is based on a recursion that can be represented as $x_{i+N}=f(x_i, x_{i+1}, x_{i+M})$, wherein N=624 and M=397 as defined by the algorithm, where the $(i+N)_{th}$ number is a function of the $i_{th}$, $(i+1)_{th}$, $(i+M)_{th}$. One common implementation of the MT19937 generator generates 624 numbers of 32-bit length with a pseudo random distribution during each iteration. A succeeding iteration relies on the results computed during a preceding iteration.

The fact that a MT19937 generator usually demands large memory space to store the state elements and frequent interactions among the state elements makes parallel processing challenging because inter-thread communications usually carry heavy overheads. Conventionally MT19937 programs only adopt a low level of parallelism with respect to multiple generators, which is an inefficient utilization of high-performance hardware. Several derivative forms of Mersenne Twister, e.g. MTGP, have been developed for parallel processing on multi-core processing units, such as a graphic processing unit (GPU) and a central processing unit (CPU), but typically yield results with statistical properties inferior to MT19937.

In addition, given the large quantity of numbers being generated (624) for each iteration and the length of each number, nearly 2.5 KB memory is used to store the state. However, the amount of fast shared memory of a typical graphic processing unit (GPU) running a conventional MT19937 program is only 48 KB per single Streaming multiprocessor (SM) which can only fit 19 such generators. In contrast, the register file of such an SM has much larger capacity, e.g. 128 KB or 256 KB, but unfortunately using the register file for this purpose in the a conventional MT19937 program requires a lot of inter-thread communication.

SUMMARY OF THE INVENTION

It would be advantageous to provide a parallel procedure for pseudo-random, number generation based on the MT19937 with efficient use of available hardware resources in a highly parallel architecture thereby improving the computation speed.

Accordingly, embodiments of the present disclosure provide computing process for pseudo-random number generation with significantly increased multithreaded parallelism. With the process, a single pseudo-random generator program is assigned with a plurality of threads able to cooperate and execute in parallel. The N state elements are indexed incrementally and arranged into a matrix comprising x rows and a plurality of columns, where a respective adjacent pair of state elements in a same column are related by g=(M+j) mod N, wherein j and g represent indexes of the pair of state elements. x can be a small value and determined by virtue of an modular manipulative inverse of M and N. The matrix is divided into sections with each section having x rows and a number of columns, and each thread is assigned with a section. In this manner, with respect to computing new state values for the N state elements, the majority of the requisite interactions among the state elements occur without expensive inter-thread communications, and further each thread only needs to communicate with other threads a small number of times (related to the value of x). The number of threads for one generator can be selected based on a balance of processing parallelism and the inter-thread communication efficiency with respect to a processor. The significantly simplified inter-thread communication pattern and reduced occurrence of communication render the program advantageously suitable for parallel processing on multi-processor GPUs or multicore CPUs thereby improving the computing efficiency.

In one embodiment of the present disclosure, a non-transient computer readable storage medium comprising executable instructions that implement a method of generating a sequence of pseudo-random numbers, the method comprises: (1) accessing an integer M and an integer N; (2) accessing N state elements indexed incrementally, each state element storing a respective first value; (3) arranging the N state elements into a matrix comprising x rows and a plurality of columns, wherein, a respective pair of adjacent state elements in a same column are related by g=(M+j) mod N, wherein j and g represent indexes of the respective pair of adjacent state elements; (4) dividing the N state elements into K sections based on indexes of the N state elements; (5) assigning K execution threads for processing the K sections, wherein each execution thread corresponds to a respective section; (6) computing respective second values of the N state elements by the K execution threads executed in parallel in accordance with a recursion relationship representable as $a_{i+N}=f(a_i, a_{i+c}, a_{i+M})$, wherein $a_{i+N}$ represents a second value of state element i, wherein $a_i$ represents a first value of state element i, wherein $a_{i+c}$ represents a first value of state element i+c and c is an integer, wherein $a_{i+M}$ corresponds to a first value of state element i+M, wherein f represents a function; and (7) outputting second values of the N state elements as the sequence of pseudo-random numbers. x may be determined by virtue of a modular arithmetic operation on the M and N, such as by solving $(i+M \cdot x) \bmod N \equiv (i+c) \bmod N$ and $(i+M \cdot x) \bmod N \equiv (i-c) \bmod N$, and selecting a resultant x with a smaller value. M and N may be constant parameters for the computation. The matrix may comprise T tail state elements which can be assigned to a number of threads respectively, or reside in shared memory. K may be determined based on a memory capacity assigned to each thread and based on inter-thread efficiency. Without taking tail elements into consideration, each thread q communicates with a single thread p to obtain corresponding first values x+1 times, wherein p=+1)mod K, wherein p and q represent thread indexes, and wherein p, q=0, 1, 2, . . . , K−1. Another K threads may be assigned for processing another N state elements storing different first values and for computing second values of the another N state elements in accordance with a jump-ahead procedure.

In another embodiment of the present disclosure, a computer implemented method of generating pseudo-random numbers comprises: (1) accessing a state vector comprising N elements that are indexed incrementally, each element storing a respective first value; (2) determining an integer x based on a modular arithmetic operation on an integer M and the N; (3) arranging the N elements into a matrix based on element indexes of the N elements; (4) dividing the N elements into K sections; (5) assigning K execution threads for processing the K sections respectively; (6) computing respective second values of the N elements by the K execution threads in parallel, wherein a second value of element i is computed in accordance with a recursive function based on respective first values of the element i, element i+c, and element i+M, wherein i represents an element index, and i=0, 1, 2, . . . , N−1, wherein c is an integer, wherein the computing the second values of the N elements comprises execution thread p only communicating with execution thread q for corresponding first values, wherein p and q represent thread indexes, and wherein p, q=0, 1, 2, . . . , K−1; and (7) outputting the respective second values of the N elements.

In another embodiment of the present disclosure, a computing system comprises: a memory; a processor; a non-transient computer-readable recording medium storing pseudo-random number generator program, the pseudo-random number generator program comprising instructions that cause the processor to perform: (1) accessing a vector comprising N elements indexed incrementally, each element storing a respective first value; (2) arranging the N elements into a matrix comprising x rows and a plurality of columns, wherein, a respective pair of adjacent elements in a column are related by g=(M+j)mod N, wherein j and g represent indexes of the respective pair, wherein M is an integer; (3) dividing the N elements into K sections based on indexes of the N elements; (4) assigning K execution threads for processing the K sections, wherein each execution thread corresponds to a respective section; (5) computing respective second values of the N elements by the K execution threads in parallel in accordance with a recursion relationship representable as $a_{i+N}=f(a_i,a_{i+c},a_{i+M})$, wherein $a_{i+N}$ represents a second value of element i, wherein $a_i$ represents a first value of element i, wherein $a_{i+c}$ represents a first value of element i+c, wherein $a_{i+M}$ corresponds to a first value of element i+M, wherein f represents a function; and (6) outputting second values of the N elements as the sequence of pseudo-random numbers.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Parallelization of Random Number Generators

Figure 1:
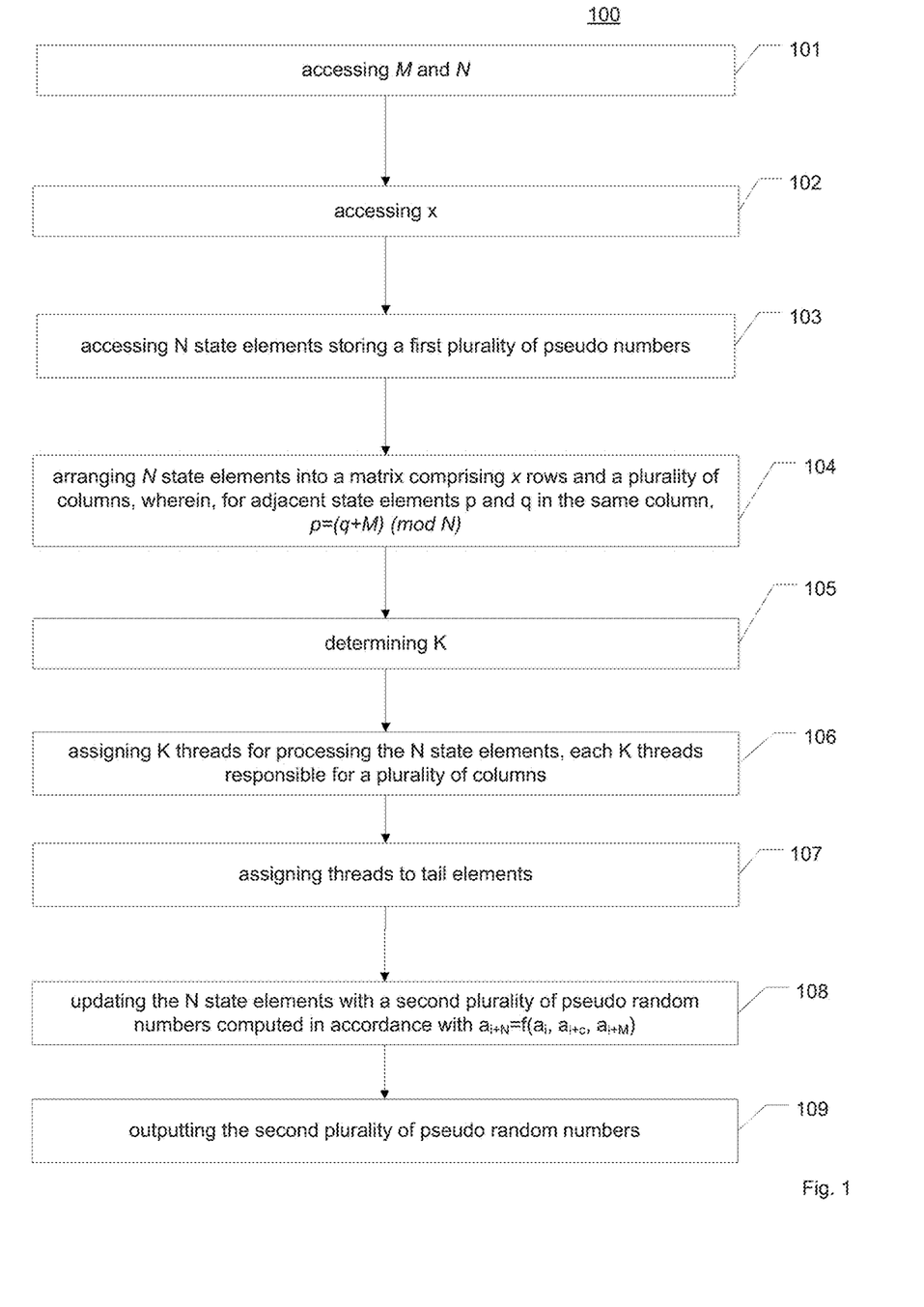
FIG. 1 is a flow chart depicting an exemplary computer implemented method of generating pseudo-random numbers by computing for N state elements in a parallel process and yet with reduced inter-thread communications in accordance with an embodiment of the present disclosure.

FIG. 1 is a flow chart depicting an exemplary computer implemented method 100 of generating pseudo-random numbers by computing for N state elements in a parallel process and yet with reduced inter-thread communications to in accordance with an embodiment of the present disclosure.

At 101, integer numbers M and N are accessed, where N may denote the length of the sequence of pseudo-random numbers to be generated in an iteration, with M<N. In some embodiments, M and N are constant parameters specified by the random generation algorithm. For instance, M=397 and N=624 are constant parameters in MT19937. In some other embodiments, M and/or N may be a variable to be configured by a user.

At 102, an integer x is accessed for purposes of configuring a particular pattern used for arranging the state elements. As will be described in greater detail below, x may represent the number of rows in a matrix in which the state elements are assigned.

In one embodiment, the integer constant c is equal to 1. At 103, The N state elements can be mapped into a matrix having x rows and C of columns according to a pattern with respect to the indexes of the N state elements. In conformance to the pattern, in each column, a respective pair of immediately adjacent elements, e.g., state element g and state element j, can be are related as g=(j+M)mod N, where g and j represent indexes of the adjacent elements, and g, j∈0, 1, . . . , N−1.

At 104, first values stored in a state vector of N length are accessed. The first values may be a sequence of random numbers resulted from the last iteration or initial values specified by a user.

At 105, the integer K representing the number of threads assigned to a generator for computation is determined. Thus K corresponds to the level of processing parallelism of the pseudo-random number generator. The number K may be determined by a balance of several factors to achieve a maximum computing efficiency. On one hand, selecting a large K number, meaning assigning too large a number of threads for generator may unduly increase the occurrences of inter-threads communication and thus counteract the computation efficiency brought by the parallel processing. On the other hand, if the K number is too small, a single thread may have to process too many state elements that accumulated exceeds the register memory capacity associated with the thread, which may force the utilization of shared memory and thereby counteract the computation efficiency as well.

At 106, the matrix is divided into K sections which are respectively assigned with K execution threads for computation. Each section has x rows and several columns. In some embodiments, the state value results from the computation can be stored in registers associated with respective threads, which is faster than a shared memory that is typically used in a conventional pseudo-random number generator.

At 107, the tail elements are assigned to selected threads for computation. At 108, the second values of the N state elements are computed based on the recursion $a_{i+N} = f(a_i, a_{i+c}, a_{i+M})$. At 109, these second values are output as the sequence of pseudo-random numbers.

Figure 2A:
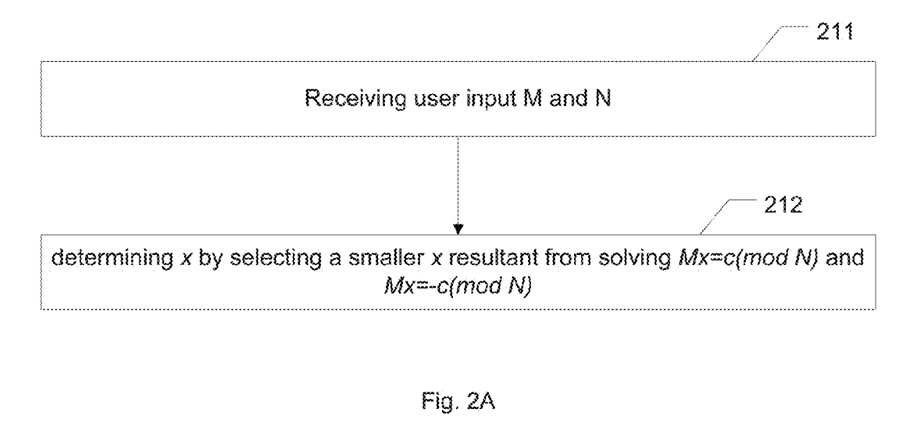
FIG. 2A is a flow chart depicting an exemplary computer implemented method of determining x, given user-supplied values of M and N.

FIG. 2A is a flow chart depicting an exemplary computer implemented method of determining x, M and N. In some pseudo-random number generator formula, M and N values are fixed and thus can be received as a user input. At 211, M and N values are received as user input.

At 212, x can be a modular manipulative inverse of M modular N. More specifically equations, for any state element index i, x should satisfies $(i+xM) \bmod N = (i+c) \bmod N$, or $(i+xM) \bmod N = (i-c) \bmod N$.

Thus, x can be derived by solving $xM \equiv c \bmod N$, which yields x=613 particularly for MT19937 where c is equal to 1, or $xM \equiv -c \bmod N$, which yields x=11 particularly for MT19937 where c is equal to 1.

As will be explained in greater detail below, a smaller x, e.g., x=11 in this case, may be preferred in order to construct a pattern offering flexibility in scaling up the number of parallel threads for efficient parallel computation. Also an x can be selected to reduce the number of tail state elements.

Figure 2B:
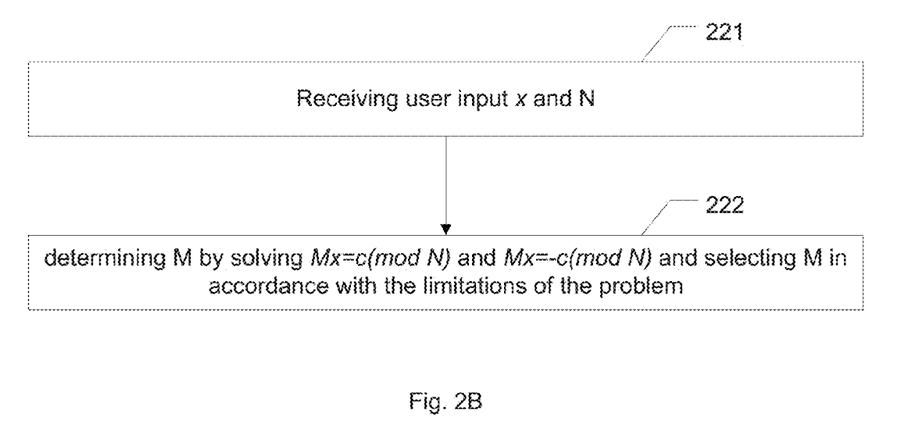
FIG. 2B is a flow chart depicting another exemplary computer implemented method of determining M, given user supplied values of x and N.

According to some other pseudo-random number generator formula, a user has the flexibility to choose M value. Thus, a relatively small x can be selected by a user, for example based on the available resources on a processor that execute a pseudo-random number generator program. FIG. 2B is a flow chart depicting another exemplary computer implemented method determining x, M and N. At 221, x and N are received as user input. At 222, M can be determined by solving:

$xM \equiv c \bmod N$, and $xM \equiv -c \bmod N$.

Figure 3:
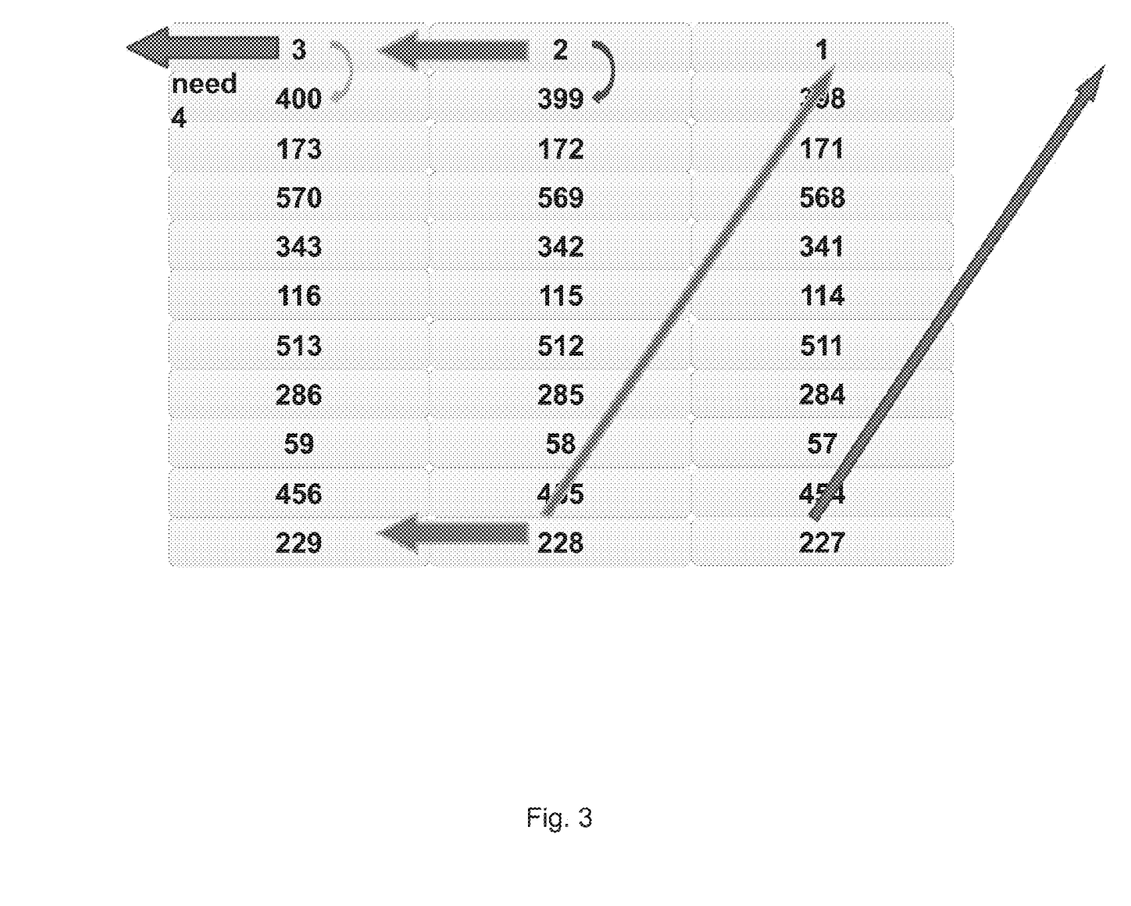
FIG. 3 illustrates an exemplary arrangement of state elements based on indexes thereof in an individual section in accordance with an embodiment of the present disclosure.

Then M is selected in accordance with the limitations of the problem. In some embodiments, a set of x values can be selected leading to derivation of a series of M values and thus a series of forms of generators. FIG. 3 illustrates an exemplary arrangement of state elements based on indexes thereof in an individual section 300 in accordance with an embodiment of the present disclosure. In this instance, c is set to 1 and the section 300 comprises 11 (x=11) rows, and 3 columns of elements. Each cell represents a state element and the number therein represents the index of the element. The section is assigned with a thread for computation. The first row is assigned with 3 elements arranged in a linear order, i.e., elements 1, 2, and 3. Each (e.g., g) of the remaining numbers is related with its preceding number (e.g., j) in the same column by g=(j+M)mod N. For example, state element 400 is immediately adjacent to state element 3, because 400=(3+397)mod 624.

The new value of each state element i is calculated based on the recursion, e.g., $a_{i+N} = f(a_i, a_{i+1}, a_{i+M})$. According to the relation g=(j+M)mod N, computation of a new value of each state element uses the current value of the state element itself(state element i), the state element situated either to its left or its right (i+1), and the state element situated M mod N away ((i+M)mod N). Thus, with respect to computing a new value of each state element i, if state element i+1, state element (i+M)mod N reside within the section 300, the new value can be computed without inter-thread communication. However, if either or both of state element i+1, state element (i+M)mod N resides in another section which is assigned to another thread, thread 300 communicates with the another thread to acquire the current values of either or both state elements. With a properly selected number of threads, the majority of the state elements can be processed without inter-thread communication owing to the relation g=(j+M) mod N in the arrangement pattern with respect to their indexes.

For instance to compute a new value for state element 3, current values of state element 3, 4, and 400 are needed, where the current value of state element 4 can be obtained by an inter-thread communication. For another instance, since the new value of state element 2 can be derived from the current values of state element 2, 3, and 399 which all reside in section 400, no inter-thread communication is needed. For still another instance, since the new value of state element 228 can be derived from the current values of state element 228, 229, and 1 (=(228+397)mod 624) which all reside in section 400, no inter-thread communication is needed.

By virtue of the arrangement pattern represented by g=(j+M)mod N as described above, inter-thread communication occurrences are reduced to a minimal number. Each thread p only communicates with one another thread q for computation of all the elements in section p for x+1 times. Further the inter-thread communication pattern is advantageously certain and simple, expressed as p=(q+1)mod K, where p, q=0, 1, . . . , K−1. A thread p may need to obtain values of some of the tail elements instead of communicating with thread q, slightly increasing the communication complexity, but the number of tail elements T is small compared to the size of N. In some embodiments, the threads assigned to an individual generator may belong to a warp on which a warp shuffle operation can be performed for exchanging data among threads, which offers better efficiency than storing data to or loading from shared memory.

Figure 4A:
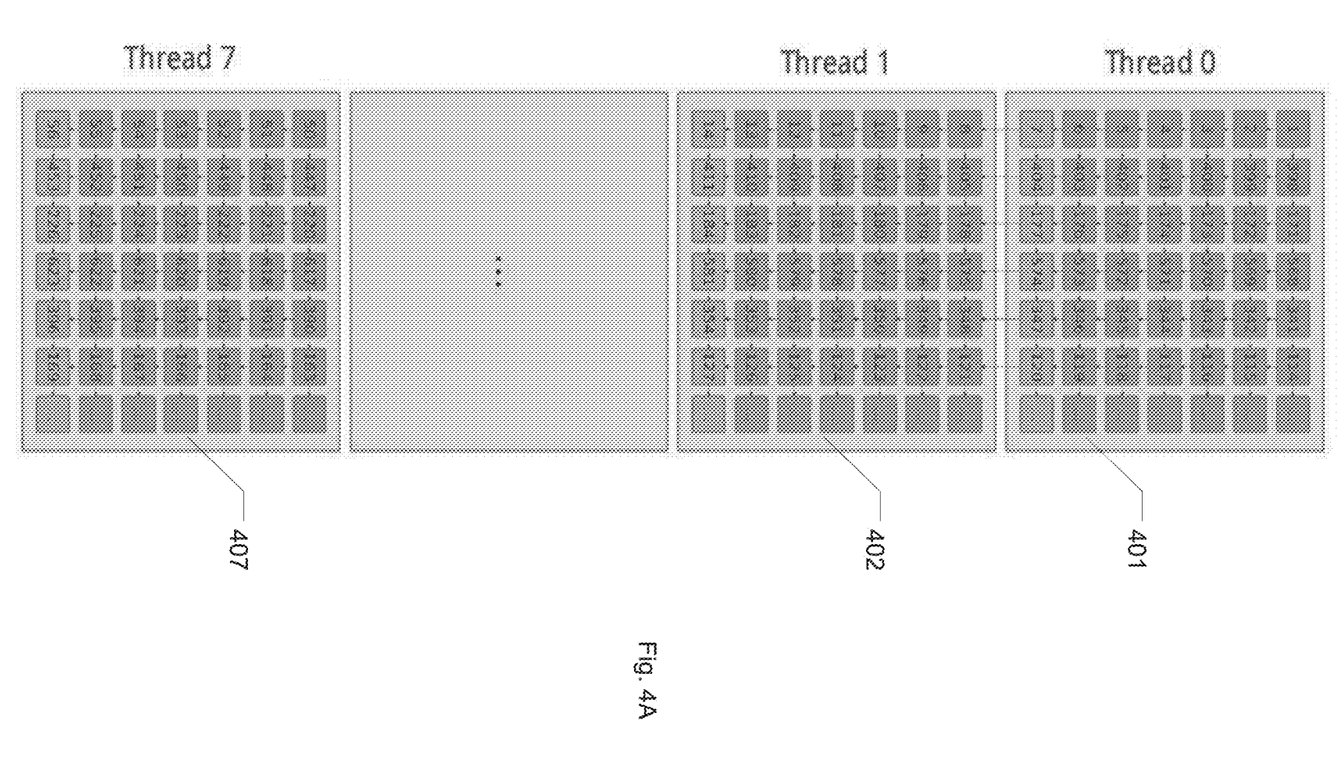
FIG. 4A illustrates an exemplary arrangement of N state elements and assignment of the parallel threads based on an arrangement pattern in accordance with an embodiment of the present disclosure.

FIG. 4A illustrates an exemplary arrangement of N state elements and an assignment of the parallel threads based on an arrangement pattern in accordance with an embodiment of the present disclosure. The N (=624) elements are arranged in accordance with the same pattern described with reference to FIG. 3 (note c is equal to 1 in this example). The 624 elements are grouped into 8 sections, e.g., 401, 402 and 407, and hence assigned to 8 threads (K=8) respectively. Each section has 11 (=x) rows and 7 columns.

The first row is populated with state elements 1-56. Each (e.g., g) of the remaining numbers is related with its preceding number (e.g., j) in the same column by g=(j+M)mod N. Each thread p only communicates with one another thread q for computation all the elements in section p for x+1 times. The inter-thread communication pattern is advantageously certain and simple, expressed as p=(q+1)mod K, where p, q=0, 1, K−1. The arrangement pattern results in tail elements, the total number of which T can be derived from N=x·C+T. T is equal to 8 in this example, wherein C represents the total number of columns.

Figure 4B:
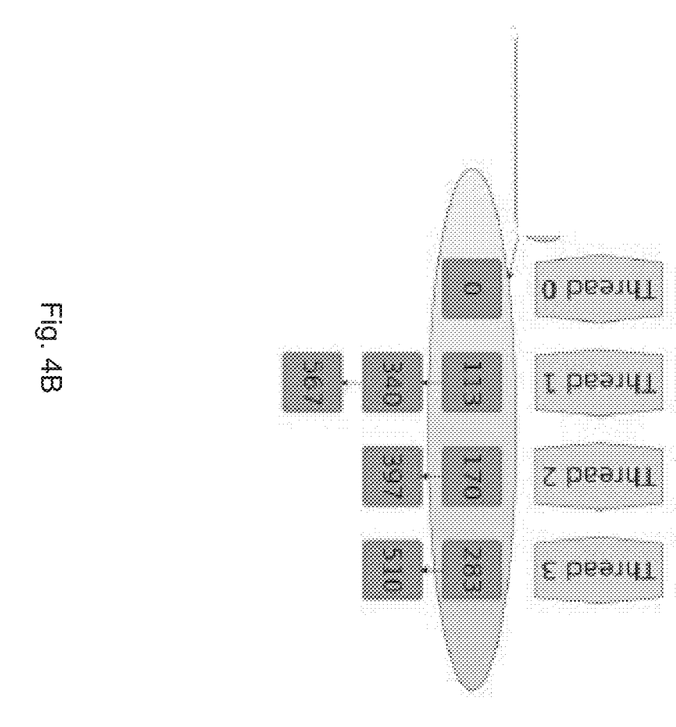
FIG. 4B illustrates an exemplary treatment of tail elements resulted from the assignment arrangement described with reference to FIG. 4A.

FIG. 4B illustrates an exemplary treatment of tail elements resulted from the assignment arrangement described with reference to FIG. 4A. As illustrated, the tail elements include elements 0, 113, 170, 283, 340, 397, 510 and 567. In the illustrated embodiment, the tail elements are distributed to threads 0, 1, 2, and 3. Elements 0, 113, 170, and 283 may be calculated before the element 227.

In general, the present disclosure can be applied in any suitable random number generation program, as well as any other data processing procedures that utilizes inter-data dependencies in the form of $a_{i+N}=f(a_i, a_{i+c}, a_{i+M})$.

In some embodiments, a number of generators can be engaged to generate a plurality of sequences of random numbers in parallel with each generator configured in accordance with an embodiment of the present disclosure. In some of such embodiments, the generators are configured with different initial values in accordance with a jumping-ahead method. For example, on GPU that processes the generators in accordance with an embodiment of the present disclosure, 64 generators can operate in parallel in each Streaming Multiprocessor, which is three times more than would fit in a shared memory. Therefore, the computing seek can be significantly high due to the high efficiency use of the high performance hardware.

Figure 5:
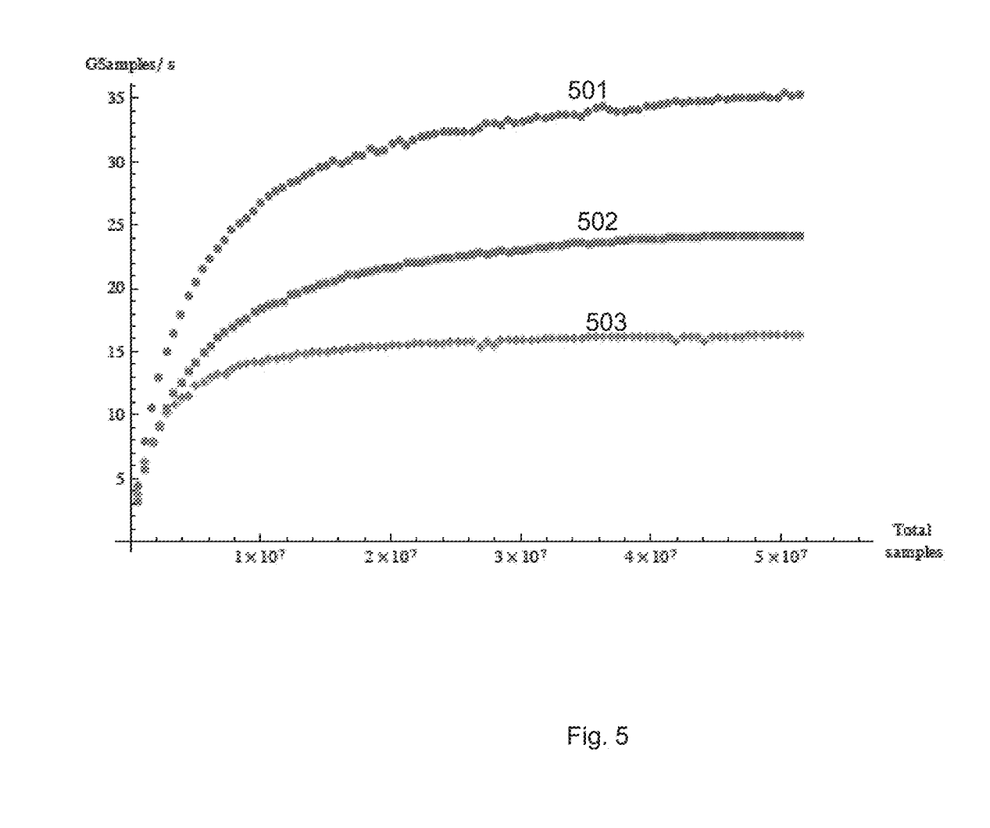
FIG. 5 is a data plot demonstrating superior computation performance of an MT19937 random number generator processed in accordance with an embodiment of the present disclosure.

FIG. 5 is a data plot demonstrating superior computation performance of an MT19937 random number generator processed in accordance with an embodiment of the present disclosure. In this example, the resulting performance of MT19937 is 2.2 times higher than an XORWOW generator and 1.5 times higher than an MTGP generator which are processed in accordance with the prior art.

Figure 6:
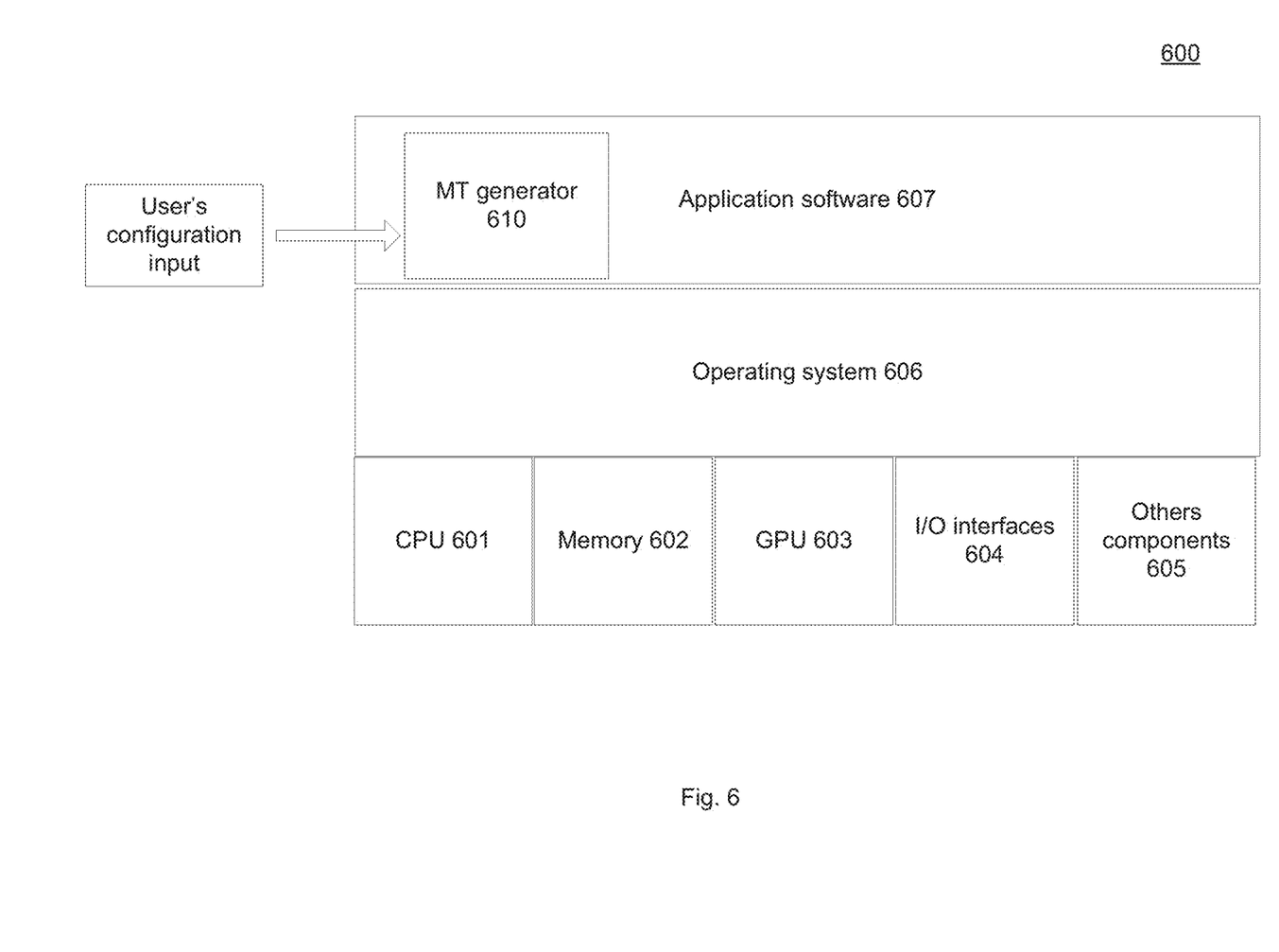
FIG. 6 is a block diagram illustrating an exemplary computing system including a Mersenne Twister random number generator in accordance with an embodiment of the present disclosure.

FIG. 6 is a block diagram illustrating an exemplary computing system 600 including a Mersenne Twister random number generator 610 in accordance with an embodiment of the present disclosure. The computing system comprises a processor 601, a system memory 602, a GPU 603, I/O interfaces 604 and other components 605, an operating system 606 and application software 607 including a Mersenne Twister random number generator stored in the memory 602. When incorporating the user's configuration input and executed by the CPU 601 or the GPU 603, the Mersenne Twister random number generator 610 can produce a sequence of random numbers by virtue of multi-thread parallel processing and with reduced inter-thread communication in accordance with an embodiment of the present disclosure. The user configuration input may include M, N, function f, and seed values for the state elements for processing, as discussed with reference to FIG. 2, FIG. 3 and FIG. 4.

The modern GPU has evolved from a fixed function graphics pipeline to a programmable parallel processor with computing power that exceeds that of multi-core CPU. Although the parallel process in accordance with the present disclosure can be executed in GPU as well as CPU, a GPU may offer a preferred platform due to its lightweight creation overhead and capability of running thousands of threads at full efficiency.

The Mersenne Twister random number generator 610 may be an integral part of any other suitable application program that is written in Python, Ruby, R, PHP, MATLAB, Fortran, C++, or any other programming languages known to those skilled in the art. The application programs may be a Monte Carlo simulation program used for simulating complex biochemical pathways, proton migration, genome coalescence, cellular biology, and computation finance.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A non-transient computer readable storage medium comprising executable instructions that implement a method of generating a sequence of pseudo-random numbers, said method comprising:

accessing an integer M and an integer N, wherein M is a predetermined number and N represents a number of state elements;

accessing N state elements indexed incrementally, each state element storing a respective first value;

arranging said N state elements into a matrix comprising x rows and a plurality of columns, wherein, a respective pair of adjacent state elements in a same column are related by $g=(M+j) \bmod N$, wherein j and g represent indexes of said respective pair of adjacent state elements;

dividing said N state elements into K sections based on indexes of said N state elements;

assigning K execution threads for processing said K sections, wherein each execution thread corresponds to a respective section;

computing respective second values of said N state elements by said K execution threads executed in parallel in accordance with a recursion relationship representable as $a_{i+N}=f(a_i,a_{i+c},a_{i+M})$, wherein $a_{i+N}$ represents a second value of state element i, wherein $a_i$ represents a first value of state element i, wherein $a_{i+c}$ represents a first value of state element i+c, wherein $a_{i+M}$ corresponds to a first value of state element i+M, wherein f represents a function, wherein c is an integer, and wherein further x, K and i are integers; and outputting second values of said N state elements as said sequence of pseudo-random numbers.

2. The non-transient computer readable storage medium of claim 1, wherein said method further comprises determining said x by virtue of a modular arithmetic operation on said M and said N.

3. The non-transient computer readable storage medium of claim 2, wherein said determining comprises solving $(i+M\cdot x) \bmod N=(i+c) \bmod N$ and $(i+M\cdot x \bmod N=(i-c) \bmod N$, and selecting a resultant x with a smaller value.

4. The non-transient computer readable storage medium of claim 1, wherein said method further comprises:

selecting said x based on available hardware resources of a processing device used for executing said method; and deriving said M by solving $(i+M\cdot x) \bmod N=(i+c) \bmod N$ and $(i+M\cdot x \bmod N=(i-c) \bmod N$.

5. The non-transient computer readable storage medium of claim 1, wherein a respective section of said K sections comprises a number of consecutive columns of said matrix, wherein a first row of said respective section comprises state elements with consecutive indexes, and wherein said K execution threads are operable to cooperate and share access to a shared memory.

6. The non-transient computer readable storage medium of claim 1, wherein said computing comprises computing in accordance with a Mersenne Twister random number generator, and wherein said M and said N are constant values defined by said generator, wherein c is equal to 1.

7. The non-transient computer readable storage medium of claim 6, wherein said computing second values for a respective section by execution thread q comprises said execution thread q communicating with execution thread p to obtain corresponding first values for x+1 times, wherein $p=(q+1) \bmod K$, wherein p and q represent thread indexes, and wherein p, q=0, 1, 2, . . . , K−1.

8. The non-transient computer readable storage medium of claim 1, wherein said matrix comprises T tail state elements, wherein T is an integer, wherein $N=x \cdot K \cdot C+T$, wherein C represents a number of columns assigned to each section, and wherein said method further comprises distributing said T tail state elements to execution threads selected from said K execution threads.

9. The non-transient computer readable storage medium of claim 8, wherein said method further comprises determining said K based on a memory capacity assigned to each execution thread and based on inter-thread communication efficiency.

10. The non-transient computer readable storage medium of claim 1, wherein said N state elements are arranged in a first state vector, and wherein said method further comprises: accessing a second state vector comprising another N state elements storing different first values than said first vector; and assigning another K execution threads for computing second values of said second state vector in parallel and in accordance with a jump-ahead process.

11. A computer implemented method of generating random numbers, said method comprising:

accessing a state vector comprising N elements that are indexed incrementally, each element storing a respective first value;

accessing an integer x and an integer M, wherein M is a predetermined number;

arranging said N elements into a matrix based on element indexes of said N elements;

dividing said N elements into K sections;

assigning K execution threads for processing said K sections respectively;

computing respective second values of said N elements by said K execution threads in parallel, wherein a second value of element i is computed in accordance with a recursive function based on respective first values of said element i, element i+c, and element i+M, wherein i represents an element index, i=0, 1, 2, . . . , N−1, and c is an integer, wherein said computing said second values of said N elements comprises execution thread p only communicating with execution thread q for corresponding first values, wherein p and q represent thread indexes, and wherein p,q=0, 1, 2, . . . , K−1; and outputting said respective second values of said N elements, wherein x, K and i are integers.

12. The computer implemented method of claim 11, wherein said matrix comprises x rows and C columns, wherein each of said section comprises x rows and C columns, and wherein a respective pair or successive elements in a same column are related by $g=(M+j) \bmod N$, wherein j and g represent element indexes of said respective pair.

13. The computer implemented method of claim 11, wherein said M and said N are user-configured values, wherein said integer x is determined by solving $(i+M\cdot x \bmod N=(i+c) \bmod N$ and $i+M\cdot x \bmod N=(i-c) \bmod N$, and selecting a resultant x with a smaller value, and wherein further execution thread p only communicates with execution thread q for equal to or less than x+1 times.

14. The computer implemented method of claim 11, wherein said x is a user selected value that is relatively small with reference to a memory capacity assigned to each execution thread, and wherein further said M is derived by solving $(i+M\cdot x) \bmod N=(i+c) \bmod N$ and $(i+M\cdot x) \bmod N=(i-c) \bmod N$.

15. The computer implemented method of claim 11 further comprising selecting said K based on a memory site assigned to a respective execution thread and inter-thread communication efficiency.

16. A computing system comprising:
a bus;
a processor coupled to said bus;

a non-transient computer-readable recording medium storing pseudo-random number generator program, said pseudo-random number generator program, comprising instructions that cause said processor to perform:

accessing a vector comprising N elements indexed incrementally, each element storing a respective first value;

arranging said N elements into a matrix comprising x rows and a plurality of columns, wherein, a respective pair of adjacent elements in a column are related by g=(M+j)mod N, wherein j and g represent indexes of said respective pair, wherein M is a predetermined integer;

dividing said N elements into K sections based on indexes of said N elements;

assigning K execution threads for processing said K sections, wherein each execution thread corresponds to a respective section;

computing respective second values of said N elements by said K execution threads in parallel in accordance with a recursion relationship representable as $a_{i+N}=f(a_i, a_{i+c}, a_{i+M})$, wherein $a_{i+N}$ represents a second value of element i, wherein $a_i$ represents a first value of element i, wherein $a_{i+c}$ represents a first value of element i+c, wherein $a_{i+M}$ corresponds to a first value of element i+M, wherein f represents a function, wherein c is a user-defined integer; and outputting second values of said N elements as said sequence of pseudo-random numbers, wherein x, K and i are integers.

17. The computing system of claim 16, wherein x is determined by virtue of modular manipulative inverse of said M and said N.

18. The computing system of claim 16, wherein, with respect to computing second values for section q, corresponding execution thread q communicates with execution thread p for data, wherein p=(q+1)mod K, and wherein p and q represent indexes of execution threads and sections of state vectors associated therewith, and wherein p, q=0, 1, 2, . . . , K−1.

19. The computing system of claim 16, wherein x is selected based on attributes of said processor, and wherein said M is determined by solving (i+M·x)mod N=(i+c)mod N and (i+M·x)mod N=(i−c)mod wherein said K execution threads are included in a single warp.

20. The computing system of claim 16, wherein said K execution threads are included in a single warp, and wherein a respective section of said K sections comprises a number of columns of consecutive column indexes, wherein a first row of said respective section comprises elements of consecutive element indexes.

* * * * *